United States Patent [19]

Genik-Sas-Berezowsky et al.

[11] Patent Number: 4,606,766
[45] Date of Patent: Aug. 19, 1986

[54] PROCESS FOR SEPARATELY RECOVERING GOLD AND SILVER FROM SOLUTION BY CARBON ADSORPTION

[75] Inventors: Roman M. Genik-Sas-Berezowsky, Edmonton; Donald R. Weir, Fort Saskatchewan, both of Canada

[73] Assignee: Sherritt Gordon Mines Limited, Toronto, Canada

[21] Appl. No.: 707,993

[22] Filed: Mar. 4, 1985

[30] Foreign Application Priority Data

Sep. 27, 1984 [CA] Canada ................................. 464181

[51] Int. Cl.$^4$ .............................................. C22B 11/08
[52] U.S. Cl. ................................. 75/118 R; 75/101 R; 75/101 BE; 75/106; 75/108; 423/29; 423/30; 423/31; 210/681; 210/684
[58] Field of Search ................. 75/118 R, 101 R, 108, 75/126, 101 BE; 423/29, 30, 31; 210/681, 684

[56] References Cited

U.S. PATENT DOCUMENTS 4,289,532 9/1981 Matson et al. .................. 75/118 R
4,501,721 2/1985 Sherman et al. ..................... 423/29

Primary Examiner—John Doll
Assistant Examiner—Robert L. Stoll
Attorney, Agent, or Firm—Robert F. Delbridge; Arne I. Fors

[57] ABSTRACT

A process for separately recovering gold and silver from a solution containing dissolved gold and silver by carbon adsorption which comprises passing the solution sequentially through a series of carbon adsorption stages and passing carbon sequentially through the series countercurrent to the solution to cause gold and silver to be loaded onto the carbon. A portion of the loaded carbon is removed partway along the series, and silver is recovered from the removed portion of the loaded carbon. Loaded carbon is removed from the beginning of the series, and gold is recovered from the carbon removed from the beginning of the series. Carbon from which gold and silver have been removed is returned to the end of the series for re-use.

2 Claims, 1 Drawing Figure

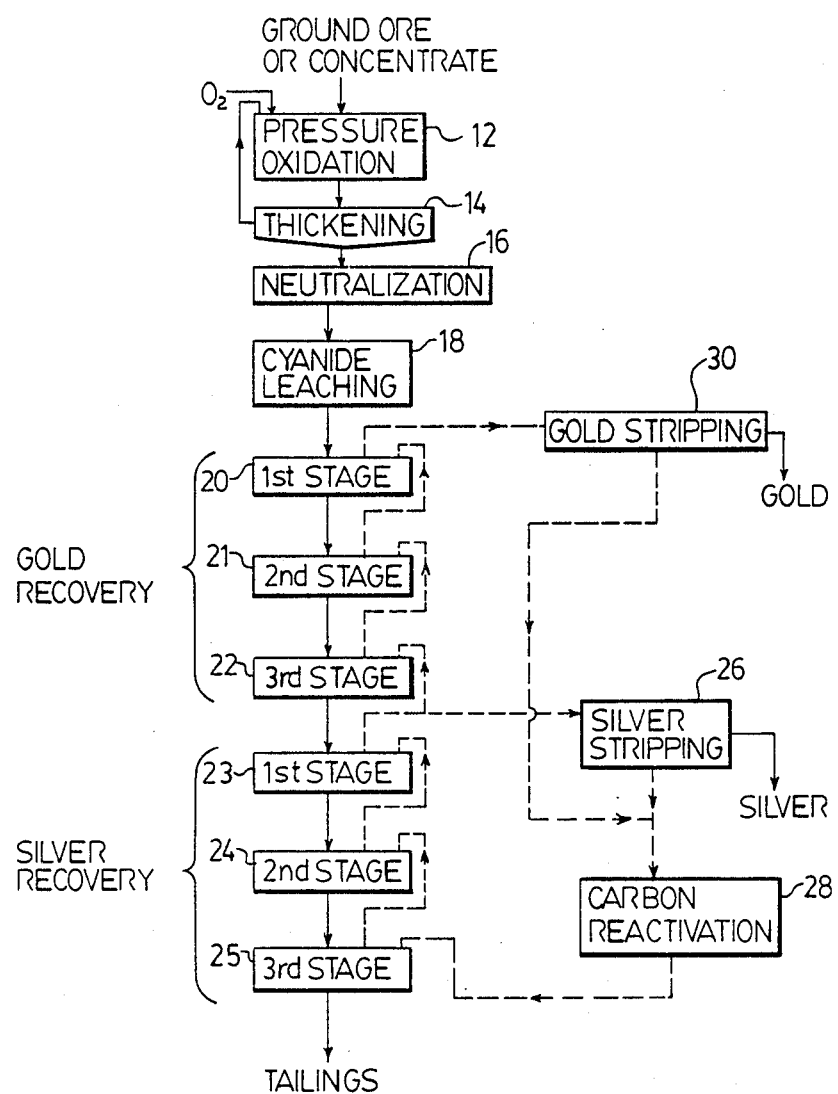

PROCESS FOR SEPARATELY RECOVERING GOLD AND SILVER FROM SOLUTION BY CARBON ADSORPTION

This invention relates to the recovery of gold and silver from gold and silver containing material.

It is known to recover gold and silver from gold and silver containing material by leaching the material, for example by cyanide leaching, and then recovering gold and silver by carbon adsorption from the resultant solution containing dissolved gold and silver, the usual practice being to conduct the carbon adsorption in stages with carbon being moved from one stage to another countercurrent to the solution flow. Barren carbon first encounters relatively barren solution, and then in successive steps encounters solution containing greater amounts of gold and silver.

Such a process can be operated in an efficient manner when the silver content of the solution is relatively small compared to the gold content. It is known that gold is adsorbed in preference to silver and will displace silver from the carbon as the total loading increases. Problems thus arise when the silver content is substantial, especially when the silver content is several times greater than the gold content. To ensure satisfactory silver recovery in such cases, it is known to increase the number of adsorption stages and/or increase the quantity of carbon. However, such techniques have various disadvantages, including the necessity for further equipment, higher carbon consumption and low carbon loadings.

According to the present invention, a portion of the loaded carbon is removed partway along the series of carbon adsorption stages, and silver is recovered from the removed portion of the loaded carbon. The remaining carbon is removed from the beginning of the series, and gold is recovered therefrom. Carbon from which gold and silver have been removed may then be returned to the end of the series for re-use.

Thus, by removing a portion of the loaded carbon partway along the series, silver can be removed before it is displaced by gold from the carbon in carbon adsorption stages nearer the beginning of the series. The initial stages in the series thus represent a gold recovery section, with the final stages in the series representing a silver recovery section. The stage in the series from which the portion of carbon is withdrawn for silver recovery, and also the relative amount of the withdrawn portion, may be varied according to the relative gold and silver contents of the solution being treated.

The invention is especially useful in the recovery of gold and silver from refractory iron containing sulphidic ore which is first subjected to a pressure oxidation treatment to improve gold and silver recovery in a subsequent gold and silver leaching step, such as cyanide leaching.

One embodiment of the invention will now be described, by way of example, with reference to the accompanying drawing, which shows a flow sheet of a process for the recovery of gold and silver from refractory iron containing sulphidic ore.

Referring to the drawing, ground ore or concentrate is subjected to a pressure oxidation step 12 in aqueous sulphuric acid solution from a subsequent thickening step 14. The ore or concentrate may contain for example from about 2 to about 500 g/t Au, from about 10 to about 500 g/t Ag, from about 5 to about 50% Fe and from about 2 to about 40% S by weight.

In pressure oxidation step 12, the ore or concentrate is treated at a temperature of from about 165° to about 200° C. under a total pressure of from about 500 to about 2000 kPa to oxidize the sulphidic content. The oxidized slurry then proceeds to a thickening step 14 where at least a part of the aqueous sulphuric acid overflow solution is recycled to the pressure oxidation leach step 12 (in which sulphuric acid is produced).

The acidic underflow slurry is passed to a neutralization step 16 where the slurry is neutralized with a neutralizing agent such as lime to raise the pH of the slurry to a value suitable for cyanidation, for example about pH 10.5. The neutralized slurry then proceeds to cyanide leach step 18 where the slurry is treated with cyanide to dissolve gold and silver therefrom. The resultant slurry containing dissolved gold and silver may have a pulp density of from about 30 to about 50% solids by weight.

The slurry is passed through six carbon adsorption stages 20 to 25, and carbon is passed through the stages 25 to 20 countercurrently to the slurry. A quantity of carbon is immersed in the last stage 25 for a period of time to adsorb gold and silver from the near barren slurry. The carbon is then transferred to stage 24 to adsorb further gold and silver and then to stage 23. Barren slurry from the last stage 25 is discarded as tailings.

After stage 23, the carbon has adsorbed a substantial amount of silver as well as some gold. A portion of the carbon is then removed and passed to a silver stripping step 26 where silver is stripped from the carbon in any suitable manner. The stripped carbon is reactivated by heating in reactivation step 28 and then used again by return to the last stage 25.

The remaining part of the carbon from stage 23 is passed successively to steps 22, 21 and 20 where gold is adsorbed in preference to silver. After the first stage 20, the carbon with adsorbed gold and some silver is passed to a gold stripping step 30 where gold is stripped from the carbon in any suitable manner. The stripped carbon then proceeds to reactivation step 28 and eventually returns to the last carbon adsorption stage 25. Thus, steps 20 to 22 form a gold recovery section and steps 23 to 25 form a silver recovery section.

An advantageous process describing pressure oxidation and related steps for recovery of gold and silver from refractory iron-containing sulphidic ore and concentrate is described in patent applications Ser. Nos. 707,922 and 707,923 filed herewith (now U.S. Pat. Nos. 4,571,263 and 4,571,264 is issued Feb. 18, 1986) filed herewith. An advantageous neutralization step prior to cyanide leaching is described in another patent application filed herewith, said application teaching the use of lime at a temperature of at least about 80° C., advantageously above about 90° C., to raise the pH to at least about 9, preferably to at least about 10.

In a specific example of the invention, pressure oxidized concentrate containing 63.5 g/t Au and 36.0 g/t Ag was passed through one stage of cyanide leaching followed by twelve stages of carbon adsorption. The solutions were analyzed in each stage for gold and silver content, and the gold and silver loading on the carbon was also measured at the end of each adsorption stage. The results are shown in the following table.

|  | Stage | Au | Ag |
|---|---|---|---|
|  |  | Solution Assays (mg/L) | |
| Cyanide Leach | 1 | 20.9 | 14.2 |
|  |  | Carbon Loadings (g/t) | |
| Carbon Adsorption | 1 | 32959 | 2239 |
|  | 2 | 31409 | 3049 |
|  | 3 | 25884 | 4062 |
|  | 4 | 13911 | 6933 |
|  | 5 | 6162 | 8349 |
|  | 6 | 1407 | 9061 |
|  | 7 | 283 | 6618 |
|  | 8 | 63 | 3415 |
|  | 9 | 24 | 1020 |
|  | 10 | 20 | 230 |
|  | 11 | 21 | 44 |
|  | 12 | 44 | 16 |

The carbon which has been subjected to steps 12 to 6 is loaded with an appreciable amount of silver, i.e. 9061 g/t, and 1407 g/t Au. A portion of the carbon can then be removed at this stage for silver recovery, giving a silver to gold ratio of about 5 to 1. The remaining carbon passes through stages 5 to 1 and becomes loaded with further gold, this remaining portion then being treated for gold recovery, giving a relatively high gold to silver ratio.

This example shows the benefits of using the invention where silver to gold ratio in the starting material is about 0.6 to 1. When the silver to gold ratio is higher, the invention is even more advantageous.

In this application, it will be apparent that reference to a solution is intended to cover the case where solids are also present to form a slurry as in described embodiment, as well as cases where the solution is not in slurry form.

The advantages of the invention will be readily appreciated by a person skilled in the art from the above description. Other examples and embodiments will also be readily apparent to a person skilled in the art, the scope of the invention being defined in the appended claims.

What we claim as new and desire to protect by Letters Patent of the United States is:

1. A process for separately recovering gold and silver from a solution containing dissolved gold and silver by carbon adsorption, comprising passing the solution sequentially through a series of carbon adsorption stages, passing carbon sequentially through the series countercurrent to the solution to cause gold and silver to be loaded onto the carbon, removing a portion of the loaded carbon partway along the series, recovering silver from the removed portion of loaded carbon, removing loaded carbon from the beginning of the series, recovering gold from the carbon removed from the beginning of the series, and returning carbon from which gold and silver have been removed to the end of the series for re-use.

2. A process according to claim 1 wherein the gold and silver containing solution is obtained by cyanide leaching of pressure oxidized refractory sulphidic ore.

* * * * *